Patented Jan. 31, 1950

2,495,714

UNITED STATES PATENT OFFICE 2,495,714

CELLULOSE DERIVATIVE PLASTICIZED WITH AN OILY DIESTER OF A POLY-HYDRIC ALCOHOL

Alexander J. Geiges, deceased, late of East Orange, N. J., by Alice S. Geiges, administratrix, East Orange, N. J., assignor to The Baker Castor Oil Company, Jersey City, N. J., a corporation of New Jersey No Drawing. Application December 13, 1944, Serial No. 568,077

6 Claims. (Cl. 106—180)

This invention relates to plasticizers capable of improving the properties of cellulose derivatives, such as the cellulose esters and ethers. These plasticizers serve to improve the pliability, resistance to cold, toughness, and other properties of the cellulosic compounds.

An object of the present invention is to provide substantially non-drying plasticizers and modifying agents from unsaturated fatty acids for cellulose derivatives, such as nitrocellulose and ethyl cellulose. Another object of this invention is to utilize relatively cheap raw materials in producing these plasticizers. A further object of the invention is to provide plasticizers having free hydroxyl groups in their molecular structure, the hydroxyl groups serving to modify the solubility and compatibility relationships of the plasticizers in a desirable manner. Other objects and advantages will hereinafter appear.

The plasticizers of this invention are substantially non-drying in character, even though they are composed, at least in part, of unsaturated fatty acids. These plasticizers are the diesters of polyhydric alcohols having at least three hydroxyl groups and unsaturated organic acids, such as may be derived from natural semi-drying or drying animal or vegetable oils or formed synthetically. The acids used in forming the diesters should have more than five carbon atoms, and should be of the unsaturated type, since the basis of this invention is the discovery that unsaturated fatty acids can be used in preparing non-drying, ester-type plasticizers. It is best not to use highly unsaturated acids, such as may be obtained by hydrolysis of the fastest drying oils, since diesters formed from such acids tend to lose their plasticizing properties through changes in their molecular structure due to polymerization and air oxidation. As indicated, there are free hydroxyl groups present in these plasticizers, since the latter are diesters of organic acids and polyhydric alcohols having at least three hydroxyl groups. The presence of the free hydroxyl groups contributes materially to the non-volatility of the esters of the invention, as similar compounds without such hydroxyl groups have much lower boiling points. Also, the free hydroxyl groups prove particularly advantageous, as regards the miscibility relationships of the diesters, when alcohol solvents are used for modifying the evaporation rate in compositions involving cellulose derivatives. However, the diesters of the invention are satisfactorily compatible with the cellulose derivatives in non-alcoholic vehicles.

The plasticizers of this invention are light-colored, non-resinous, viscous oils. It is preferred that the unesterified hydroxyl groups in the diesters remain free, and not linked up through the splitting off of water to form ether-type linkages, as the full advantages of the presence of the hydroxyl groups are not obtained in the latter case. The plasticizers of this invention are the indicated diesters, as, in the case of the tri- and higher esters, the choice of acids which can be used in forming non-drying plasticizers is strictly limited. However, the diesters of acids ranging up to a fairly high degree of unsaturation form quite suitable plasticizers, since such esters are non-drying or dry at such a very slow and inappreciable rate that the plasticizing properties of such diesters are substantially unaffected.

The diesters of this invention are characterized particularly by their non-drying and plasticizing properties. Consequently, they may be used desirably in coatings of the nitrocellulose lacquer type. Here, as in other types of coatings formulated from cellulose derivatives, the coatings containing the diesters have improved adhesion, toughness, flexibility, and resistance to cold as compared to plasticizers known and used heretofore. Also, the preparation of these diesters can be so controlled that the diesters have a substantially neutral reaction. As a result, these diesters do not tend to react with basic pigments, and thus, one cause of livering of compositions containing such pigments can be eliminated readily.

The principal type of organic acids used in forming the diesters of this invention are the unsaturated fatty acids having more than five carbon atoms, preferably more than nine carbon atoms, and, suitably, with iodine numbers less than about 185. More highly unsaturated fatty acids may be used, by themselves, or in admixture with fatty acids having two or less double bonds, that is, with iodine numbers less than about 185. The diesters formed from fatty acids having iodine numbers greater than about 185 tend to depart somewhat from the non-drying properties of the other diesters, but are still sufficiently slow drying as to justify their inclusion in the "substantially non-drying" category.

Suitable acids may be obtained, for example, by hydrolysis of naturally occurring semi-drying and drying oils of vegetable or animal origin. Typical acids which are suitable for use in this connection are oleic, linoleic, erucic, undecylenic, myristolenic, palmitolenic, cetoleic, and similar acids.

Mixtures of acids obtained from natural oils are suitable for the preparation of the diesters of this invention. Oils which are suitable sources of acids are, for example: corn, soyabean, cottonseed, linseed, tung, castor, sunflower, walnut seed, sardine, menhaden, whale, and other similar oils. A particularly economical source of fatty acids is the foot stocks which separate out in the caustic refining of various fatty oils, including corn, soyabean, cottonseed, linseed, and like oils. The foot stocks yield the free fatty acids on hydrolysis and distillation, preferably under reduced pressure. One of the objects of this invention is accomplished by the use of acids derived from such foot stocks, as the diesters formed from such acids are relatively quite inexpensive plasticizers.

Rosin acids may also be used in forming the new plasticizers. Such acids may be derived from rosin, hydrogenated rosin, polymerized rosin, and the like. Examples of suitable terpenic acids are abietic, pimaric, and sapinic acids.

A number of polyhydric alcohols may be used in forming the new plasticizers. The main requirement is that the alcohols contain at least three hydroxyl groups, so that diesters can be formed which have free hydroxyl groups. As indicated previously, it is desired that the unesterified hydroxyl groups be present as such, and that there be no inner ether or polymer formation through the splitting out of water molecules from two or more such hydroxyl groups in the same or different molecules. Typical suitable polyhydric alcohols are for example, glycerol, erythritol, pentaerythritol, sorbitol, mannitol, dulcitol, iditol, enneaheptitol, inositol, quebrachitol, and carbohydrates. The syrups of hexahydric alcohols, such as the product obtained by the reduction of glucose, may be utilized without isolation of the purified alcohols. In general, the alcohols may be used in dilute or concentrated form, and, as indicated, may be crude or refined.

The diesters of the present invention may be prepared in different ways. In general, the preferred way involves heating the fatty or other acid and polyhydric alcohol in an approximate molar ratio of 2:1 at an elevated temperature in the range from 150° to 275° C. in the presence of a small amount of catalyst, the whole being blanketed by an inert gas, such as carbon dioxide, nitrogen, or water gas, which is bubbled through the reaction mixture. The inert gas serves the purpose of removing the water, formed in the esterification reaction, and removing air, which would cause darkening of the product at the elevated reaction temperature. Typical catalysts which may be used are litharge, calcium oxide, zinc oxide, barium oxide, magnesia, sodium hydroxide, or calcium acetate. The catalyst is used in an amount ranging between 0.05% and 2%, based on the weight of acid used. A typical example of the preparation of a diester by this method involves the preparation of the half-ester of pentaerythritol and soyabean oil fatty acids.

*Example 1.*—A mixture of 136 parts by weight of pentaerythritol (Pentek), 576 parts of soyabean oil fatty acids, and 7 parts of litharge was cooked at 250° C., while carbon dioxide was bubbled slowly through the mixture. The heating was continued for about three or four hours at the end of which time it was found that the acid number of the reaction mixture was less than 20. The reaction mixture was then cooled and filtered to yield a light-colored viscous liquid, which proved to be a desirable plasticizer for use in nitrocellulose lacquers.

An ester interchange reaction may also be used for forming the diesters. Thus, suitable naturally occurring glycerides may be reacted with glycerine, pentaerythritol, or other polyhydric alcohols in the presence of a catalyst, the proportion of polyhydric alcohol being chosen so as to yield the appropriate diester.

In the case of certain types of polyhydric alcohols, the indicated esterification temperature (150°–275° C.) will cause undesirable side reactions. Thus, with hexahydric alcohols, inner ethers are formed at the indicated temperatures, while such temperatures cause discoloration and charring of the carbohydrates. A lower esterification temperature, preferably below 140° C., may be used in such cases, provided that some more reactive acidic material is utilized. Thus, satisfactory diesters may be formed by treating hexahydric alcohols or carbohydrates with acid chlorides in the presence of pyridine at temperatures of 100°–135° C.

Various substituents, such as halogen, amino, or alkyl groups, may be present in the finished diesters. Such substituents may be introduced directly into the diester molecule, but are preferably present initially in either the acid or alcohol reactant.

As indicated, the properties of cellulose esters and ethers are improved by the use of the modifying agents of this invention. Typical cellulose derivitatives which may be treated with the new plasticizers are: nitrocellulose, cellulose acetate, cellulose propionate, cellulose butyrate, cellulose acetostearate, cellulose acetomalate, cellulose nitroacetate, ethyl cellulose, butyl cellulose, benzyl cellulose, and the like.

The diesters of this invention are readily useful as plasticizing modifiers of nitrocellulose, as when the latter is used in lacquer and enamel compositions. Other ingredients may be present with the nitrocellulose, preferably 0.5–5.0 sec. viscosity, and diester, as, for example, oils, waxes, natural and synthetic resins, pigments, driers, solvents, and the like. Such compositions may be used for protecting and decorating many types of surfaces, among them being those of leather, rubber, porous materials, wood, and metal. The following is a typical example of a nitrocellulose lacquer containing one of the new plasticizers:

*Example 2.*—Nitrocellulose lacquer:

|  | Per cent |
|---|---|
| Nitrocellulose | 15 |
| Half-ester of pentaerythritol and dehydrated castor oil acids | 10 |
| Butyl acetate | 29 |
| Toluol | 34 |
| Butanol | 9 |
| Ethanol | 3 |

Similiar lacquers can be prepared with other diesters, such as the half-ester of pentaerythritol and soyabean oil fatty acids, and by varying the proportions of solids, solvents, and diluents. The exact proportions used will depend on the hardness of film desired, the rate of evaporation of solvent mixture required, and other similar factors.

The diesters of this invention having at least two free hydroxyl groups can be reacted with polybasic organic acids to form alkyd resins. The latter may be used with pigments, etc. for producing improved enamels and paints.

The plasticizers of this invention may be used in conjunction with high viscosity nitrocellulose to form plastic masses which can be formed into molded products. In addition to their use with cellulose derivatives, the diesters may be employed for imparting elasticity and toughness to brittle resins and the like, such as rosin, ester gum, phenol-aldehyde resins, urea-formaldehyde resins, cumarone resin, pontianak resin, copal gum, kauri gum, dammar gum, other gums and balsams and similar materials. The diesters may be incorporated with such resins and inert fillers, and such compositions may then be molded to yield toughened resins.

The plasticizers of this invention may be used in compositions from which transparent, strong, flexible, substantially waterproof sheets or films of a desired thinness are formed. Tough sheets containing the new plasticizers may, for example, be used as a support for light-sensitive photographic coatings. Such sheets, when compounded as to be sufficiently tacky and adhesive, may also be used in the manufacture of safety glass. Another application is the use of sheeting containing a plasticizer of the diester type to form the tread of felt-base floor coverings.

*Example 3.*—A typical composition which yields a film having excellent properties is:

| | Per cent |
|---|---|
| Nitrocellulose | 16 |
| Diester of sorbitol and corn oil fatty acids | 8 |
| Butyl acetate | 38 |
| Ethanol | 19 |
| Benzol | 19 |

This composition, on being poured onto a suitable surface and being allowed to evaporate, gives a desirable film.

*Example 4.*—Cellulose acetate may also be used in forming sheets and films, the following being a typical example of a suitable composition:

| | Per cent |
|---|---|
| Cellulose acetate, acetone-soluble, containing about 40% acetyl radical | 20 |
| Acetone | 75 |
| Erythritol dioleate | 5 |

The cellulose acetate is dissolved by stirring in the acetone, and the plasticizer is then added. This composition may be deposited on any suitable film-forming surface to give a transparent, tough, flexible film with low inflammability.

The new plasticizers may be employed for modifying nitrocellulose used in the manufacture of artificial leather, and in impregnating and fabric-coating compositions. A typical fabric-coating composition is the following:

*Example 5.*—Fabric-coating composition:

| | Per cent |
|---|---|
| Nitrocellulose | 10 |
| Diester of glycerine and cottonseed oil fatty acids | 10 |
| Pigment | 5 |
| Benzol | 35 |
| Ethyl acetate | 20 |
| Denatured alcohol | 20 |

As indicated previously, various proportions of ingredients may be used if such compositions, depending on the specific characteristics desired. Thus, as an example, the ratio of volatile solvents to non-volatile constituents may be as low as 1:3 when the composition is to be applied by calendering in the form of a plastic mass. Or, the volatile solvents may be omitted entirely, and the nitrocellulose may be plasticized in a mixer followed by rolling, cake-pressing, and sheeting by itself or on a supporting base material, such as cloth.

The diesters of this invention may be used as a substitute for camphor in the manufacture of celluloid. They may also be used in insulating compositions, especially when the diesters are non-acidic or have an acid number less than about 30. The diesters may also be used to plasticize the filaments in the manufacture of artificial silk by the dry or wet spinning methods. They may also be used in such compositions as suppository bases, cosmetic creams, and textile lubricants.

The diesters of this invention may also be used in the preparation of fatty oil compositions similar in properties to castor oil. Such preparations have particular value when the supply of castor oil is limited. Because of its non-drying properties and because of the hydroxyl groups in its mo'ecular structure, castor oil has a number of applications. Among these are its use in various types of finishes, in hydraulic brake fluids, and for lubricating aircraft engines. It has been found that naturally occurring oils having iodine numbers below about 135 may be mixed with typical diesters of this invention, and, if necessary, may be air-blown to yield products having iodine numbers below about 100. Such products have an hydroxyl group content much greater than that of any natural oil except castor oil and non-drying properties similar to those of castor oil. Typical oils which may be utilized in preparing such castor oil substitutes are: corn oil, olive oil, soyabean oil, cottonseed oil, rapeseed oil, sunflower seed oil, palm kernel oil, and whale oil. The oil and diester may be mixed in such proportions as will yield products having suitable acetyl numbers and which, with or without blowing, have suitable viscosities. Thus, for example, soyabean oil and pentaerythritol diundecylenate may be mixed in approximately equal proportions, and air-blown to give a product having an iodine number of 90–100 and an acetyl number of over 80. Such compositions are useful for plasticizing ester and ether derivatives of cellulose in compositions such as lacquers and other types of compositions indicated in the foregoing description.

A number of applications of the diesters of this invention have been described above. It is not intended, however, that the invention be limited to the specific examples.

What is claimed is:

1. A plasticized composition of matter suitable for use in coating, sheeting, molding and impregnating operations comprising nitrocellulose and, as a plasticizer therefor, a viscous, oily diester of pentaerythritol and dehydrated castor oil fatty acids.

2. A plasticized composition of matter suitable for use in coating, sheeting, molding, and impregnating operations comprising nitrocellulose and, as a plasticizer therefor, a viscous, oily diester of a polyhydric alcohol having at least four hydroxyl groups and of an unsaturated aliphatic, monobasic acid, said acid containing more than 9 carbon atoms and more than one double bond per molecule, and being derived from a vegetable oil.

3. The composition of claim 2, in which said unsaturated acid is derived from vegetable oil foots.

4. The composition of claim 2 in which said polyhydric alcohol has from four to seven hydroxyl groups, inclusive.

5. The composition of claim 2 in which said polyhydric alcohol has four hydroxyl groups.

6. A plasticized composition of matter suitable for use in coating, sheeting, molding, and impregnating operations comprising a cellulose derivative selected from the group consisting of nitrocellulose, cellulose acetate, cellulose proprionate, cellulose butyrate, cellulose acetostearate, cellulose acetomalate, cellulose nitroacetate, ethyl cellulose, butyl cellulose and benzyl cellulose, and, as a plasticizer for said cellulose derivative, a viscous, oily diester of a polyhydric alcohol having at least four hydroxyl groups and of an unsaturated aliphatic, monobasic acid containing more than 9 carbon atoms and more than one double bond per molecule.

ALICE S. GEIGES,
*Administratrix of the Estate of Alexander J. Geiges, Deceased.*

REFERENCES CITED

The following references are of record in the file of this patent:

UNITED STATES PATENTS

| Number | Name | Date |
|---|---|---|
| 2,079,108 | Dreyfus | May 4, 1937 |
| 2,085,014 | Dreyfus et al. | June 29, 1937 |
| 2,301,480 | Trowell | Nov. 10, 1942 |
| 2,326,992 | Bellac | Aug. 17, 1943 |
| 2,339,428 | Rummelsburg | Jan. 18, 1944 |
| 2,343,021 | Oswald | Feb. 29, 1944 |
| 2,346,409 | Anderson | Apr. 11, 1944 |
| 2,359,874 | Rummelsburg | Oct. 10, 1944 |
| 2,367,376 | Rector | Jan. 16, 1945 |